United States Patent
Wang et al.

(10) Patent No.: US 9,241,274 B2
(45) Date of Patent: Jan. 19, 2016

(54) METHOD FOR AVOIDING IN-DEVICE COEXISTENCE INTERFERENCE IN WIRELESS COMMUNICATION TERMINAL, TERMINAL AND ENODEB

(71) Applicant: FUJITSU LIMITED, Kawasaki-shi, Kanagawa (JP)

(72) Inventors: Weiwei Wang, Beijing (CN); Yanling Lu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 13/936,735

(22) Filed: Jul. 8, 2013

(65) Prior Publication Data
US 2013/0294412 A1  Nov. 7, 2013

Related U.S. Application Data

(63) Continuation of application No. PCT/CN2011/070073, filed on Jan. 7, 2011.

(51) Int. Cl.
*H04L 1/00* (2006.01)
*H04W 16/14* (2009.01)
(Continued)

(52) U.S. Cl.
CPC .......... *H04W 16/14* (2013.01); *H04W 72/1215* (2013.01); *H04W 36/14* (2013.01); *H04W 88/06* (2013.01)

(58) Field of Classification Search
CPC ..... H04W 16/14; H04W 28/04; H04W 72/00; H04W 72/04; H04W 36/14; H04W 36/20; H04W 72/1215; H04W 88/06; H04W 72/082

USPC ............ 455/436–438, 442–444, 63.1, 552.1, 455/553.1; 370/338, 331, 319, 321, 442
See application file for complete search history.

(56) References Cited

U.S. PATENT DOCUMENTS

2008/0192806 A1   8/2008  Wyper et al.
2014/0031036 A1*  1/2014  Koo et al. .................. 455/434

FOREIGN PATENT DOCUMENTS

CN   101300870   11/2008
CN   101940020   1/2011
(Continued)

OTHER PUBLICATIONS

International search report issued for corresponding International Patent Application No. PCT/CN2011/070073, mailed Oct. 20, 2011, with English translation.
(Continued)

*Primary Examiner* — Dady Chery
(74) *Attorney, Agent, or Firm* — Myers Wolin, LLC

(57) ABSTRACT

The present invention provides a method, terminal and base station for avoiding device coexistence interference of a wireless communication terminal. The wireless communication terminal includes a Long Term Evolution (LTE)/Long Term Evolution Advanced (LTE-A) communication module and a coexistence communication module. The method includes the following steps: a first sending step, sending a coexistence communication module startup notification message to the base station, and a first interference avoidance step, before sending auxiliary information to the base station, the wireless communication terminal using a Time Division Multiplexing (TDM) mode between the LTE/LTE-A communication module and the coexistence communication module.

42 Claims, 5 Drawing Sheets

(51) Int. Cl.
*H04W 72/12* (2009.01)
*H04W 36/14* (2009.01)
*H04W 88/06* (2009.01)

(56) References Cited

FOREIGN PATENT DOCUMENTS

JP 2012-525761 A 10/2012
WO 2010/126340 A2 11/2010

OTHER PUBLICATIONS

Notice of Preliminary Rejection issued for corresponding Korean Patent Application No. 10-2013-7020927 mailed on Jan. 20, 2015 with an English translation.
Notice of Reason for Rejection issued for corresponding Japanese Patent Application No. 2013-547790, mailed on Mar. 24, 2015, with an English translation.
Huawei et al., "General consideration on TDM", Agenda Item: 7.9.2.4, 3GPP TSG-RAN WG2 Meeting #72, R2-106398, Jacksonville, USA, Nov. 15-19, 2010.
Fujitsu, "A default TDM setting following the reactive indication", Agenda Item: 6.8.2, 3GPP TSG-RAN WG2 Meeting #73bis, R2-112099, Shanghai, China, Apr. 11-15, 2011.
First Notification of Office Action and Search Report issued by the State Intellectual Property Office of China for corresponding Chinese Patent Application No. 201180051990.6, dated Jun. 24, 2015, with an English translation.
Samsung, "Possible TDM Solution for LTE, WiFi and BT In-device Coexistence", Agenda Item: 7.8, 3GPP TSG-RAN WG2 Meeting #71bis, R2-105572, Xian, China, Oct. 11-15, 2010.
CMCC, "Framework and procedure of in-device coexistence interference avoidance", Agenda Item: 7.9.2.4, 3GPP TSG-RAN WG2 Meeting #72, R2-106382, Jacksonville, US, Nov. 15-19, 2010.

\* cited by examiner

METHOD FOR AVOIDING IN-DEVICE COEXISTENCE INTERFERENCE IN WIRELESS COMMUNICATION TERMINAL, TERMINAL AND ENODEB

CROSS-REFERENCE TO RELATED APPLICATIONS

This application is a continuation of International Application No. PCT/CN2011/070073, filed on Jan. 7, 2011, which is hereby incorporated by reference in its entirety.

TECHNICAL FIELD

The present invention relates to wireless communication technologies, and particularly, to a method for avoiding in-device coexistence interference in a wireless communication terminal, a terminal and an eNodeB.

BACKGROUND

In recent years, the fast increase of various wireless applications promotes the wireless communication system to be developed rapidly. On one hand, the performances of various wireless communication technologies (e.g., the $3^{rd}$ or $4^{th}$ generation cellular network, the Wireless Local Area Network (WLAN), the Bluetooth, etc.) are greatly improved. On the other hand, the modes for a user to access the network are also diversified, especially after the smart terminal appears, the user terminal can be integrated with a variety of communication modules of the wireless system (herein the mode where a variety of communication modules coexist is referred to as in-device coexistence), so as to simultaneously access multiple wireless networks, such as Long Term Evolution (LTE) system and advanced LTE (LTE-A) system, WLAN (Wireless Local Area Network), Bluetooth, and Global Navigation Satellite System (GNSS). Herein for the convenience of description, other communication modules (e.g., WLAN, Bluetooth and GNSS communication modules) which coexist with the LTE/LTE-A communication module in the terminal are collectively referred to as coexistence communication modules.

Under the device coexistence mode, the transceivers of the communication modules have a small physical gap and their respective operation frequencies are close to each other, thus communication interferences certainly occur among the communication systems. For example, currently the possible operation frequency ranges of the LTE/LTE-A system include frequency range 40 (2300 MHz~2400 MHz), frequency range 13 (777 MHz~787 MHz), frequency range 14 (788 MHz~798 MHz) and frequency range 7 (2500 MHz~2570 MHz); the WLAN and the Bluetooth work in the Industrial, Scientific and Medical (ISM) frequency range (2400 MHz~2483.5 MHz); and the possible operation frequency range of the GNSS is L1/E1 (1575.42 MHz). Thus, the transmission in the frequency range 40 of the LTE/LTE-A system may interfere with the reception in the frequency range of the ISM, the transmission in the frequency range of the ISM may interfere with the reception in frequency range 40 of the LTE/LTE-A system, the transmission in the frequency range 7 of the LTE/LTE-A system may interfere with the reception in the frequency range of the ISM, and the transmission in the frequency range 13/14 of the LTE/LTE-A system may interfere with the reception in the frequency range L1/E1 of the GNSS. In order to reduce the interference caused by in-device coexistence on the communication of one another so far as possible, studies on the mechanism for avoiding the in-device coexistence interference increasingly attract attentions. At present, the 3GPP has started a research group which is devoted to those studies. Currently, there are mainly two schemes for solving the problem of in-device coexistence interference: 1) Frequency Division Multiplexing (FDM) scheme, i.e., when the coexistence interference is found, the operation frequency of the LTE/LTE-A communication module of the terminal (or the coexistence communication module) is switched to a frequency having no or small interference; and 2) Time Division Multiplexing (TDM) scheme, i.e., making the LTE/LTE-A communication module of the terminal and other coexistence communication module work in the time division mode, so as to ensure that the modules do not transmit and receive signals at the same time. The above two schemes can effectively avoid the interference in the coexisting device, and their common characteristic is that the terminal shall provide some assistant information to the eNodeB (i.e., eNB), so as to help the eNB in deciding to use an appropriate mode (e.g., when the FDM scheme is adopted, the eNB decides a frequency to which the LTE/LTE-A communication module of the terminal shall be switched; and when the TDM scheme is adopted, the eNB decides an operation time duty ratio between the LTE/LTE-A communication module and other coexistence communication module) to avoid the interference. Before acquiring the assistant information, the terminal shall measure for a period of time, during which interference still exists between the LTE/LTE-A communication module and other coexistence communication module. But at present, neither the FDM scheme nor the TDM scheme considers how to avoid the in-device coexistence interference in the period of time. Thus, how to avoid the in-device coexistence interference before providing the assistant information to the eNB is a problem to be solved.

SUMMARY

The present invention is devoted to provide a method for avoiding in-device coexistence interference in a wireless communication terminal, a terminal and an eNodeB (eNB), so as to overcome one or more deficiencies existing due to the limitations of the prior art, and provide at least one beneficial selection.

According to an aspect of the present invention, a method for avoiding in-device coexistence interference in a wireless communication terminal having communication module and coexistence communication module is provided, the method comprises the steps of: a first transmitting step: transmitting a notification message of a start of the coexistence communication module to an eNB; and a first interference avoiding step: adopting, by the wireless communication terminal, a Time Division Multiplexing (TDM) operation mode between the communication module and the coexistence communication module, before transmitting assistant information to the eNB.

According to another aspect of the present invention, a method for avoiding in-device coexistence interference in a wireless communication terminal having communication module and coexistence communication module is provided, the method comprises the steps of: receiving from a target eNB a first mode setting message that carries TDM setting information for a TDM operation mode after a source eNB for network handover transmits to the target eNB a notification message of a start of the coexistence communication module; and adopting, by the wireless communication terminal, the TDM operation mode between the communication module and coexistence communication module before transmitting assistant information to the target eNB.

According to another aspect of the present invention, a method for avoiding in-device coexistence interference in a wireless communication terminal having communication module and coexistence communication module is provided, the method comprises the steps of: in case during a network handover, a source eNB of the wireless communication terminal transmits to a target eNB a notification message of a start of the coexistence communication module, adopting, by the wireless communication terminal, a default TDM operation mode between the communication module and the coexistence communication module before transmitting assistant information to the target eNB.

According to another aspect of the present invention, a method for avoiding in-device coexistence interference in a wireless communication terminal having communication module and coexistence communication module is provided, the method comprises the steps of: receiving from the wireless communication terminal a notification message of a start of the coexistence communication module before receiving assistant information from the wireless communication terminal, wherein the notification message indicates first information that the coexistence communication module has been started, or second information that the coexistence communication module has been started and the wireless communication terminal adopts a default TDM operation mode or a TDM operation mode set by itself between the communication module and the coexistence communication module; and transmitting a first mode setting message that carries TDM setting information to the wireless communication terminal, when the notification message indicates the first information.

According to another aspect of the present invention, a method for avoiding in-device coexistence interference in a wireless communication terminal having communication module and coexistence communication module is provided, the method comprises the steps of: receiving, by a target eNB, from a source eNB a notification message of a start of the coexistence communication module before receiving assistant information from the wireless communication terminal; and transmitting a first mode setting message that carries TDM setting information to the wireless communication terminal.

According to another aspect of the present invention, a wireless communication terminal having communication module and coexistence communication module is provided, the communication module comprising a transmitting unit and a receiving unit, wherein, the transmitting unit is configured to transmit a notification message of a start of the coexistence communication module to an eNB before transmitting assistant information to the eNB; the wireless communication terminal further comprising: a coordination module configured to adopt a TDM operation mode between the communication module and the coexistence communication module before the transmitting unit transmits the assistant information to the eNB.

According to another aspect of the present invention, a wireless communication terminal having communication module and coexistence communication module is provided, the communication module comprising a transmitting unit and a receiving unit, wherein, the receiving unit is configured to receive from a target eNB a first mode setting message that carries TDM setting information for a TDM operation mode, after the wireless communication terminal completes a network handover and before the transmitting unit transmits assistant information to the target eNB; and the wireless communication terminal further comprising: a coordination unit configured to adopt the TDM operation mode between the communication module and coexistence communication module before the assistant information is transmitted to the target eNB.

According to another aspect of the present invention, wireless communication terminal having communication module and coexistence communication module is provided, the communication module comprising a transmitting unit and a receiving unit, wherein the wireless communication terminal further comprising: a coordination unit configured to adopt a default TDM operation mode between the communication module and coexistence communication module after a network handover of the wireless communication terminal is completed and before the transmitting unit transmits assistant information to the eNB.

According to another aspect of the present invention, an eNB is further provided, comprising: a receiving unit configured to receive from a wireless communication terminal a notification message of a start of a coexistence communication module before receiving assistant information from the wireless communication terminal, wherein the notification message indicates first information that the coexistence communication module has been started, or second information that the coexistence communication module has been started and the wireless communication terminal adopts a default TDM operation mode or a TDM operation mode set by itself between the communication module and the coexistence communication module; and a transmitting unit configured to transmit a first mode setting message that carries TDM setting information to the wireless communication terminal, when the notification message indicates the first information.

According to another aspect of the present invention, an eNB is further provided, comprising: a receiving unit configured to receive from a source eNB of a wireless communication terminal a notification message of a start of a coexistence communication module, before receiving assistant information from the wireless communication terminal; and a transmitting unit configured to transmit a first mode setting message that carries TDM setting information to the wireless communication terminal.

According to the above aspects of the present invention, the in-device coexistence interference in the wireless communication terminal can be avoided before the wireless communication terminal provides the assistant information to the eNB.

In order to achieve the aforementioned and related objects, the present invention includes the features sufficiently described later and specifically pointed out in the claims. The following descriptions and drawings detailedly elaborate the specific exemplary embodiments of the present invention. However, these embodiments are just several ones of various embodiments capable of using the principle of the present invention. According to the following detailed descriptions of the present invention made with reference to the drawings, other objects, advantages and novel features will be clearer.

BRIEF DESCRIPTION OF THE DRAWINGS

In the drawings, the same or corresponding reference signs are used to denote the same or corresponding components throughout the drawings, and also the same or corresponding components in more than one embodiment. The drawings just illustrate some embodiments of the present invention, and a person skilled in the art can obtain other drawings from these drawings without paying any creative effort. In the drawings.

DESCRIPTION OF THE EMBODIMENTS

The technical solutions of the embodiments of the present invention will be clearly and completely described as follows with reference to the drawings in the embodiments. Obviously, the described embodiments are just some embodiments of the present invention rather than all the embodiments. Any other embodiment obtained by a person skilled in the art based on the embodiments of the present invention without paying any creative effort will fall within the protection scope of the present invention.

To be noted, in order to avoid the present invention being vague due to unnecessary details, the drawings only illustrate device structures and/or processing steps closely related to the solutions according to the present invention, while omitting other details not so closely related to the present invention.

A hybrid mechanism for avoiding in-device coexistence interference is proposed in the embodiments of this invention. In the hybrid mechanism, the wireless communication terminal includes an LTE/LTE-A communication module, and a coexistence communication module such as WLAN communication module, ISM communication module (e.g., Bluetooth and/or WiFi communication module) and GNSS module. The mechanism enables the terminal to adopt the TDM operation mode between the LTE/LTE-A communication module and the coexistence communication module before providing assistant information to an eNB, i.e., the operations between the LTE/LTE-A communication module and the coexistence communication module are coordinated using the TDM mode, so as to avoid the in-device coexistence interference.

Embodiment 1

Figure 1:
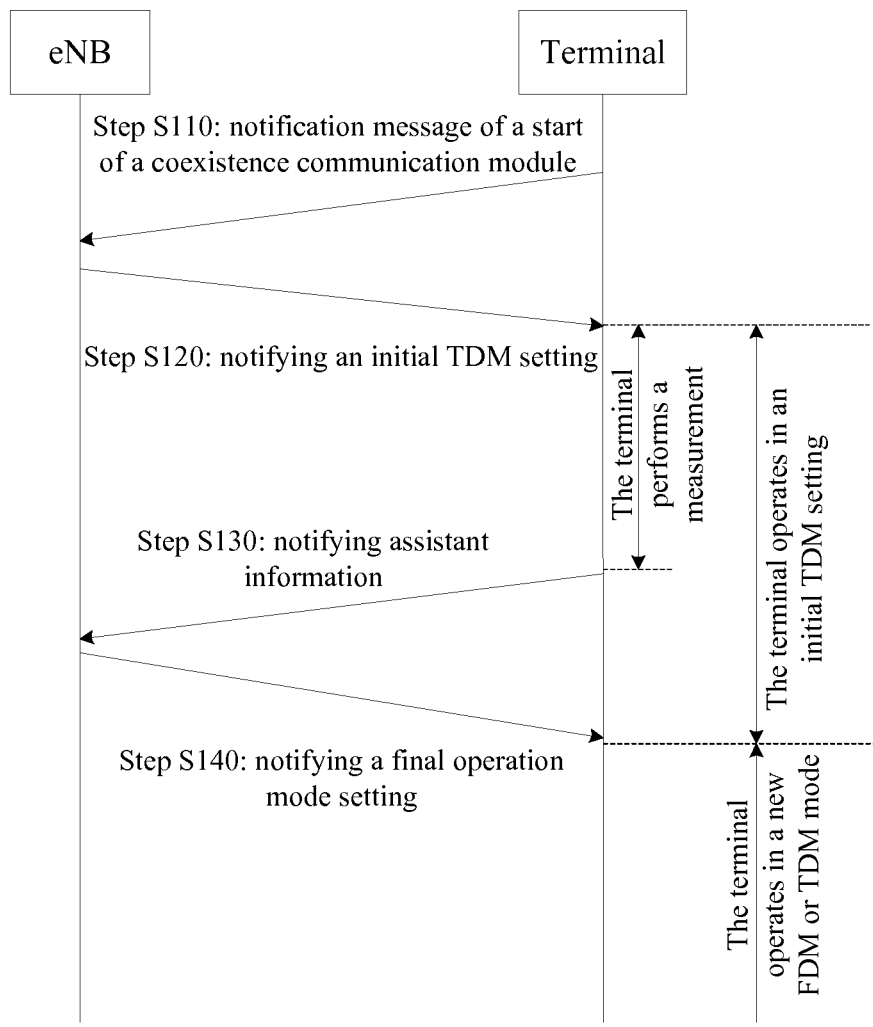
FIG. 1 is a flow diagram of a method for avoiding in-device coexistence interference in Embodiment 1 of the present invention.

FIG. 1 is a flow diagram of a method for avoiding in-device coexistence interference in Embodiment 1 of the present invention. In this embodiment, when the eNB learns that the coexistence communication module of the terminal is started while not acquiring the assistant information sent from the terminal, the eNB adopts the initial TDM mode to set the operation mode between the LTE/LTE-A communication module and the coexistence communication module of the terminal. After the measurement for a period of time, the terminal notifies the eNB of related assistant information. Next, the eNB determines the operation mode between the LTE/LTE-A communication module and the coexistence communication module of the terminal according to the assistant information, and then notifies the terminal. Specifically, the method includes the following steps:

Step S110: the terminal transmits a notification message of a start of the coexistence communication module to the eNB, so as to notify the eNB of the start of the coexistence communication module of the terminal.

Preferably, the step may be triggered when one of the following conditions occurs: a) the coexistence communication module of the terminal is just started, e.g., the coexistence communication module is just powered on; b) the coexistence communication module of the terminal has been started and the cache of the terminal contains data to be transmitted by the coexistence communication module; and c) the terminal having the coexistence communication module just hands over to a new cell, and the coexistence communication module has been started. Under any of the above conditions, the terminal can transmit a notification message (notification signaling) of the start of the coexistence communication module to the eNB.

Step 120: the eNB transmits an initial TDM setting to the terminal.

At that time, the eNB does not acquire from the terminal any assistant information for setting the FDM or TDM mode, so the eNB transmits an initial TDM setting to the terminal. For example, the eNB may transmit a first mode setting message (signaling) that carries initial TDM setting information to the terminal. After receiving the initial TDM setting information, the terminal may set the operations of the LTE/LTE-A communication module and the coexistence communication module according to the initial TDM setting information, so that the terminal uses the TDM operation mode between the LTE/LTE-A communication module and the coexistence communication module.

In one exemplary embodiment, the initial TDM setting information may be represented in the following forms:

a) unique TDM default setting information commonly known in the whole network (including the eNB and the terminal), such as respective fixed operation time (e.g., 10 ms) of the LTE/LTE-A communication module and the coexistence communication module.

b) a TDM setting selected from a TDM setting list pre-stored in the eNB.

The network may provide a list including various TDM setting information. The eNB may select a TDM setting suitable for the current system condition from the list, and then notifies the terminal.

c) a periodic measurement gap setting of the current LTE/LTE-A system.

For example, only the coexistence communication module operates within the measurement gap, while only the LTE/LTE-A communication module operates beyond the measurement gap. The LTE/LTE-A system may have a plurality of periodic measurement gap settings, and the eNB may select one therefrom.

d) a TDM setting newly set by the eNB according to the current system condition (e.g., network environment).

When the TDM operation mode is adopted between the LTE/LTE-A communication module and the coexistence communication module, the terminal will perform related measurement for example of the currently available or unavailable frequency resources (based on the assistant information of the FDM), the duty ratio between the operation time of the LTE/LTE-A communication module and the operation time of the coexistence communication module (based on the assistant information of the TDM), etc.

Based on the above steps S110-S120, the terminal can adopt the initial TDM operation mode between the LTE/

LTE-A communication module and the coexistence communication module before providing the assistant information to the eNB, so as to effectively avoid the in-device coexistence interference.

Optionally, in order to ensure that the terminal correctly receives the initial TDM setting, the method of the present invention may further include (not shown): after receiving the initial TDM setting signaling, the terminal transmits a setting confirmation message to the eNB, so that the eNB acquires that the terminal has received the TDM setting.

In addition, after the terminal acquires the assistant information through measurement, the method may further include the following steps:

Step S130: transmitting the assistant information to the eNB, i.e., notifying the assistant information to the eNB.

After the measurement for a period of time, the terminal has known the operation conditions of the LTE/LTE-A communication module and the coexistence communication module in a certain extent, and acquires related assistant information which may be the assistant information based on the FDM and/or the TDM. The assistant information based on the FDM for example may include available or unavailable frequency resources. The assistant information based on the TDM for example may include a duty ratio between the operation time of the LTE/LTE-A communication module and the operation time of the coexistence communication module.

If the terminal decides or hopes to operate in a certain mode (FDM or TDM), it may only need to feed back assistant information corresponding to the decided or hoped mode to the eNB, i.e., to feed back assistant information based on the FDM or assistant information based on the TDM. If the terminal cannot decide the operation mode, it may feed back assistant information related to the two modes to the eNB, i.e., to feed back assistant information based on the FDM and assistant information based on the TDM.

Step S140: the eNB notifies the final mode setting to the terminal.

For example, the eNB may transmit to the terminal a second mode setting message that carries second mode setting information indicating an operation mode to be adopted between the LTE/LTE-A communication module and coexistence communication module.

Specifically, according to the assistant information received in step S130, the eNB may select an appropriate operation mode (FDM or TDM) and corresponding appropriate setting and then notifies them to the terminal. For example, if the assistant information based on the FDM is received, the eNB may select the FDM operation mode, select or set appropriate FDM setting according to the current system condition, and provide it to the terminal. If the eNB determines that the FDM operation mode is inappropriate at present according to the current system condition, the eNB may also select the TDM operation mode according to the system condition, select or set appropriate TDM setting, and provide it to the terminal. In that case, the TDM setting may be the same as or different from the initial TDM setting in step S120. If the assistant information based on the TDM is received, the eNB may select the TDM operation mode, select or set appropriate TDM setting according to the current system condition, and provide it to the terminal. If both the assistant information based on the FDM and the assistant information based on the TDM is both received, the eNB may determine one operation mode (e.g., the FDM operation mode) according to the current system condition, select or set appropriate corresponding setting (e.g., the FDM setting), and provide it to the terminal.

In addition, optionally, the present invention may further include (not shown): after receiving the mode setting information transmitted by the eNB, the terminal transmits a confirmation message to the eNB.

After receiving the final mode setting information from the eNB, the terminal can determine the final FDM or TDM operation mode, and coordinate the operations between the LTE/LTE-A communication module and the coexistence communication module using the FDM or TDM operation mode according to the FDM or TDM setting information, i.e., adopting the FDM or TDM operation mode between the LTE/LTE-A communication module and the coexistence communication module.

As mentioned above, in this embodiment, the terminal sets the operations between the LTE/LTE-A communication module and the coexistence communication module according to the initial TDM setting before providing the assistant information to the eNB, thereby more effectively avoiding the in-device coexistence interference in the terminal.

Embodiment 2

In Embodiment 1, the eNB provides the initial TDM setting information to the terminal. In Embodiment 2, in order to simplify the system design, step S120 may be omitted, instead, before providing the assistant information to the eNB, the terminal itself decides to use the initial TDM setting and notifies the base station.

Figure 2:
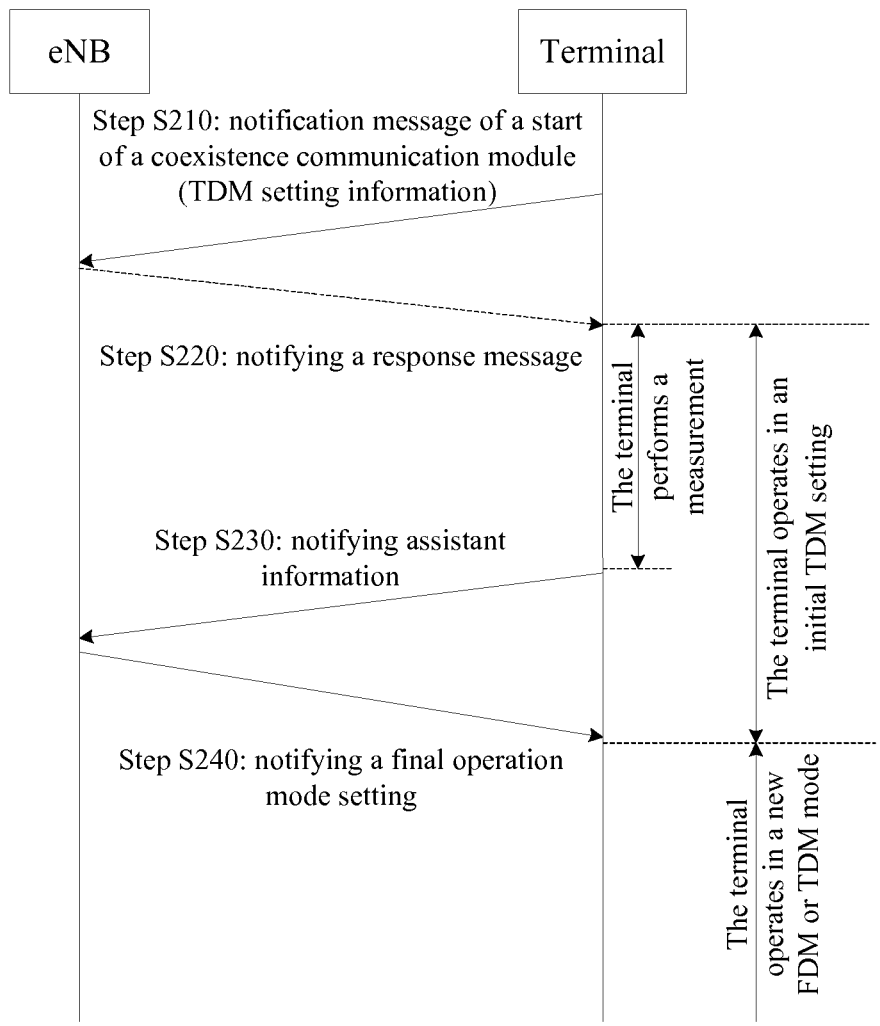
FIG. 2 is a flow diagram of a method for avoiding in-device coexistence interference in Embodiment 2 of the present invention.

As illustrated in FIG. 2, the method for avoiding in-device coexistence interference in Embodiment 2 includes the following steps:

Step S210: the terminal transmits to the eNB a notification message of a start of the coexistence communication module, so as to notify the eNB of the start of the coexistence communication module.

Preferably, the step may be triggered when one of the following conditions occurs: a) the coexistence communication module of the terminal is just started, e.g., the coexistence communication module is just powered on; b) the coexistence communication module of the terminal has been started and the cache of the terminal contains data to be transmitted by the coexistence communication module; and c) the terminal having the coexistence communication module just hands over to a new cell, and the coexistence communication module has been started.

Specifically, when finding that the coexistence communication module is started (e.g., the coexistence communication module is just powered on, or the coexistence communication module needs to transmit data), or the terminal just performs a handover and the coexistence communication module has been started, the terminal transmits a notification signaling (notification message) to the eNB. In that case, the notification message transmitted from the terminal to the eNB may not include the TDM setting information, but the notification message can indicate that the terminal will use the default TDM setting to coordinate the operation between the LTE/LTE-A communication module and the coexistence communication module, while indicating the start of the coexistence communication module. After that, the terminal and the eNB may adopt a default operation mode corresponding to the default TDM setting between the LTE/LTE-A communication module and the coexistence communication module. As an example, the default TDM setting may be unique in the whole network and commonly known by the eNB and terminal, such as respective fixed operation time (e.g., 10 ms) of the LTE/LTE-A communication module and the coexistence communication module.

In another example of the present invention, the notification message of the start of the coexistence communication module may further carry the initial TDM setting information. The initial TDM setting information for example may be represented in the following forms: a) an unique TDM default setting commonly known by the wireless communication terminal and the eNB; the unique TDM default setting for example is unique TDM default setting information commonly known in the whole network (including the eNB and the terminal), such as respective fixed operation time (e.g., 10 ms) of the LTE/LTE-A communication module and the coexistence communication module; b) a TDM setting selected from a TDM setting list of the wireless communication terminal; c) a periodic measurement gap setting of the current LTE/LTE-A system; or d) a TDM setting newly set by the terminal according to the current system condition (e.g., network environment).

For example, when the wireless communication system has a plurality of TDM setting information commonly known in the whole network, the terminal may select one therefrom according to the operation condition, then attach the selected TDM setting information to the notification signaling and transmit to the eNB. Next, the eNB and the terminal set the operation between the LTE/LTE-A communication module and coexistence communication module according to the TDM setting.

In Embodiment 2, the initial TDM setting adopted by the terminal is the default unique TDM setting in the whole network or a TDM setting selected by the terminal, thus the terminal cannot consider the condition of the whole network to select a more appropriate setting, and the system performance is influenced in a certain extent, but the method can simplify the signaling design.

Optionally, after receiving the notification message from the terminal, the eNB may return a notification response message (not shown) to the terminal.

When the TDM operation mode is adopted between the LTE/LTE-A communication module and the coexistence communication module, the terminal will perform related measurement for example of the currently available or unavailable frequency resources, the duty ratio between the operation time of the LTE/LTE-A communication module and the operation time of the coexistence communication module, etc.

After the terminal acquires the assistant information, the subsequent steps (e.g., steps S230 and S240) may be the same as corresponding steps (e.g., steps S130 and S140) in Embodiment 1.

In addition, optionally, the present invention may further include (not shown): the terminal may transmit a confirmation message to the eNB after receiving the setting information from the eNB.

Embodiment 3

In the above embodiments, in a case where the terminal just completes the network handover and the coexistence communication module has been started, the notification message of the start of the coexistence communication module is transmitted from the terminal to the eNB. In this embodiment, during and after the network handover, the notification message of the start of the coexistence communication module may be transmitted from a source eNB of the terminal to a target eNB of the terminal.

Figure 3:
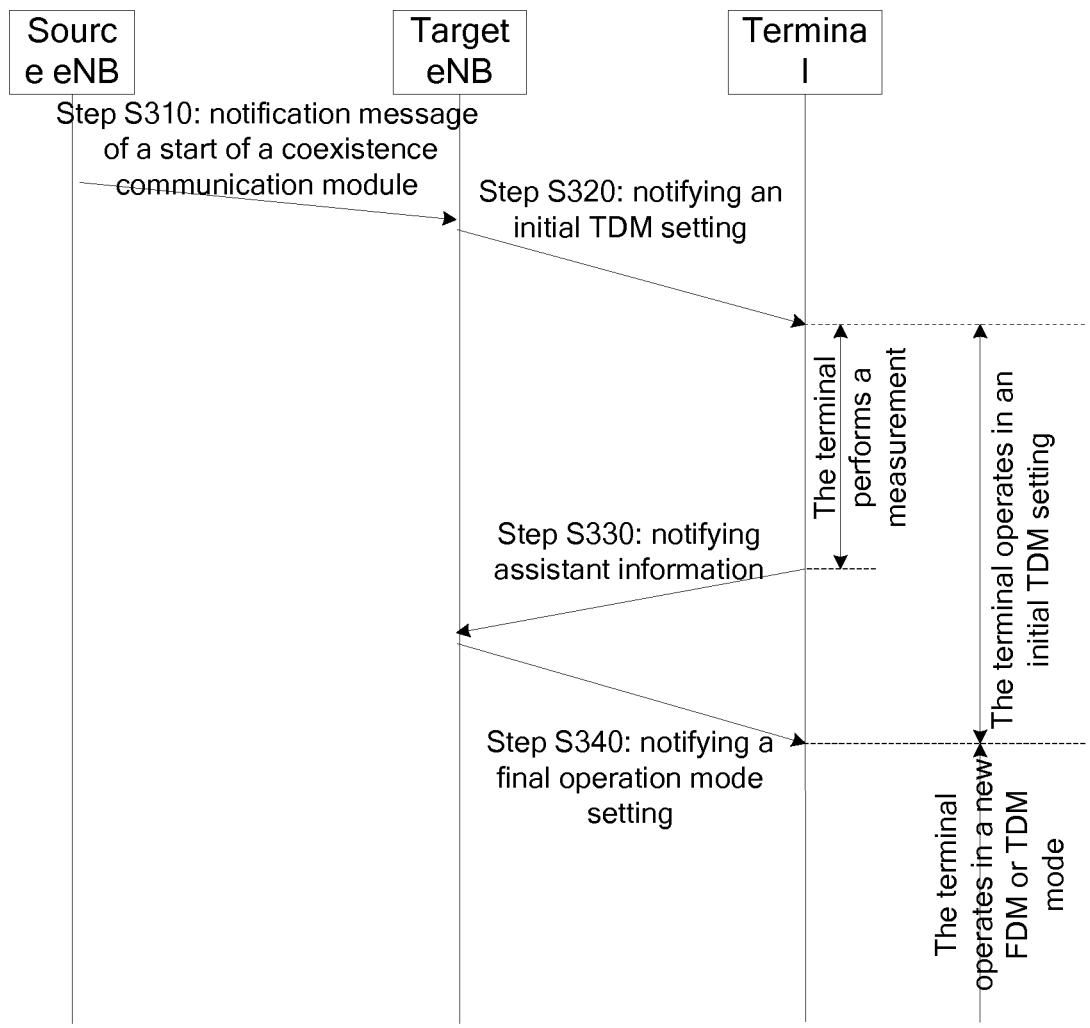
FIG. 3 is a flow diagram of a method for avoiding in-device coexistence interference in Embodiment 3 of the present invention.

As illustrated in FIG. 3, the method for avoiding in-device coexistence interference in Embodiment 3 includes the following steps:

Step S310: during or after the network handover, if the coexistence communication module of the terminal has been started, the source eNB transmits a notification message of the start of the coexistence communication module to the target eNB.

Optionally, after receiving the notification message from the source eNB, the target eNB may return a notification response message to the source eNB.

In which, the notification message of the start of the coexistence communication module preferably does not carry the initial TDM setting information, but the present invention is not limited thereto, and the notification message of the start of the coexistence communication module may also carry the initial TDM setting information. The situation where the notification message of the start of the coexistence communication module carries the initial TDM setting information will be described in Embodiment 4.

In a case where the initial TDM setting information is not carried, the notification message of the start of the coexistence communication module may just indicate the start of the coexistence communication module, or indicate that the terminal will use the default TDM setting to coordinate the operation between the LTE/LTE-A communication module and the coexistence communication module while indicating the start of the coexistence communication module.

When the notification message of the start of the coexistence communication module just indicates the start of the coexistence communication module, the method in the embodiment may further include:

S320: the target eNB transmits the initial TDM setting to the terminal.

The initial TDM setting may be: a) unique TDM default setting information commonly known in the whole network (including the eNB and the terminal), such as respective fixed operation time (e.g., 10 ms) of the LTE/LTE-A communication module and the coexistence communication module; b) a TDM setting selected from a TDM setting list in the target eNB; c) a periodic measurement gap setting of the current LTE/LTE-A system; or d) a TDM setting newly set by the target eNB according to the current system condition (e.g., network environment).

The detailed description of step S320 may be the same as that of step S120.

After receiving the initial TDM setting from the target eNB, the terminal may adopt the initial TDM operation mode between the LTE/LTE-A communication module and the coexistence communication module before providing the assistant information to the target eNB, so as to effectively avoid the interference.

If the notification message of the start of the coexistence communication module also indicates that the terminal will use the default TDM setting to coordinate the operation between the LTE/LTE-A communication module and the coexistence communication module while indicating the start of the coexistence communication module, step S320 may be omitted. In that case, after the network handover, the terminal and the target eNB may coordinate the operation between the LTE/LTE-A communication module and the coexistence communication module according to the default TDM setting. As an example, the default TDM setting may be unique in the whole network and commonly known by the eNB and the terminal, such as respective fixed operation time (e.g., 10 ms) of the LTE/LTE-A communication module and the coexistence communication module.

When the initial TDM operation mode is used between the LTE/LTE-A communication module and the coexistence communication module, the terminal will perform related measurement for example of the currently available or unavailable frequency resources, the duty ratio between the operation time of the LTE/LTE-A communication module and the operation time of the coexistence communication module, etc.

After the terminal acquires the assistant information through the measurement, the subsequent steps (e.g., steps S330 and S340) may be the same as corresponding steps (e.g., steps S130 and S140) in Embodiment 1.

In addition, optionally, the present invention may further include (not shown): the terminal may transmit a confirmation message to the target eNB after receiving the setting information from the target eNB.

Embodiment 4

Figure 4:
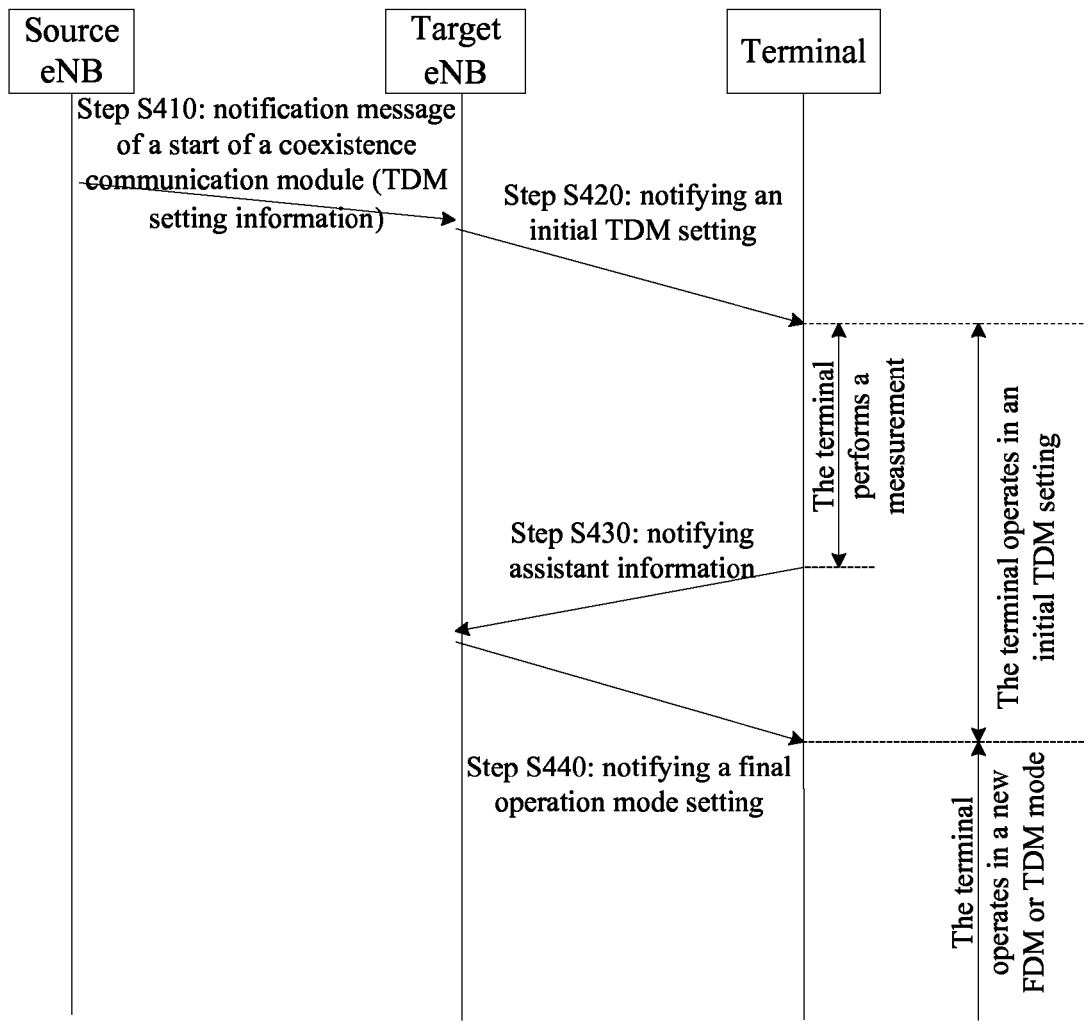
FIG. 4 is a flow diagram of a method for avoiding in-device coexistence interference in Embodiment 4 of the present invention.

In a case where the notification message of the start of the coexistence communication module transmitted from the source eNB to the target eNB carries the initial TDM setting information, as illustrated in FIG. 4, the method for avoiding in-device coexistence interference in Embodiment 2 includes the following steps:

Step S410: during or after the network handover, if the coexistence communication module of the terminal has been started, the source eNB transmits a notification message of the start of the coexistence communication module to the target eNB, wherein the notification message of the start of the coexistence communication module carries initial TDM setting information.

The initial TDM setting information for example may be: a) unique TDM default setting information commonly known in the whole network (including the eNB and the terminal), such as respective fixed operation time (e.g., 10 ms) of the LTE/LTE-A communication module and the coexistence communication module; b) a TDM setting selected from a TDM setting list in the source eNB; c) a periodic measurement gap setting of the current LTE/LTE-A system; or d) a TDM setting newly set by the source eNB according to the current system condition (e.g., network environment), but the present invention is not limited thereto.

When the notification message of the start of the coexistence communication module carries the initial TDM setting, the TDM setting is the default TDM setting or a TDM setting selected by the source eNB, and it is not certainly suitable for the target eNB, thus the system performance may be influenced in a certain extent.

Optionally, after receiving the notification message from the source eNB, the target eNB may return a notification response message (not shown) to the source eNB.

S420: the target eNB transmits the initial TDM setting to the terminal.

The initial TDM setting may be the initial TDM setting in the notification message of the start of the coexistence communication module from the source eNB. If the target eNB determines that the TDM setting from the source eNB is not suitable for the target eNB, the target eNB may also reselect or reset appropriate TDM setting information according to the system condition, and provides it to the terminal.

In a case where the initial TDM setting information carried in the notification message transmitted by the source eNB is the unique TDM default setting information commonly known in the whole network (including each eNB and terminal), step S420 may be omitted.

When the TDM operation mode is adopted between the LTE/LTE-A communication module and the coexistence communication module, the terminal will perform related measurement for example of the currently available or unavailable frequency resources, the duty ratio between the operation time of the LTE/LTE-A communication module and the operation time of the coexistence communication module, etc.

After the terminal acquires the assistant information through the measurement, the subsequent steps (e.g., steps S430 and S440) may be the same as corresponding steps (e.g., steps S130 and S140) in Embodiment 1.

In addition, optionally, the present invention may further include (not shown): the terminal may transmit a confirmation message to the eNB after receiving the setting information from the eNB.

In another exemplary embodiment of the present invention, when the terminal again performs the network handover, the method of this embodiment may further include the following step (not shown):

During or after the network handover, if the coexistence communication module of the terminal has been started, the source eNB corresponding to this network handover (i.e., the target eNB in step S310 or S410) transmits a notification message of the start of the coexistence communication module to a new target eNB, wherein the notification message of the start of the coexistence communication module may carry or not carry the initial TDM setting information.

The terminal and the eNB of the present invention will be described as follows in conjunction with the method for avoiding in-device coexistence interference.

Embodiment 5

Figure 5:
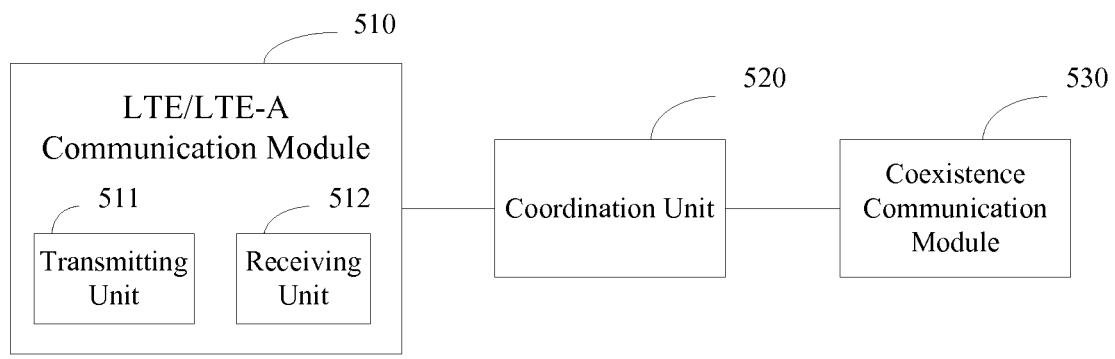
FIG. 5 is a block diagram of a wireless communication terminal in an exemplary embodiment of the present invention.
Figure 6:
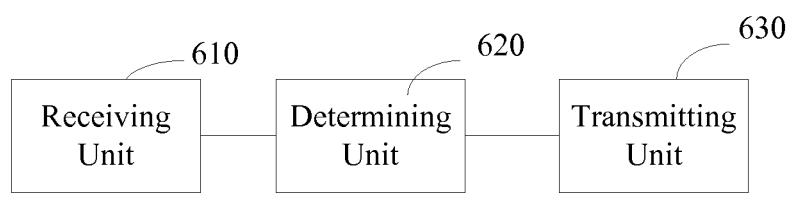
FIG. 6 is a block diagram of an eNB in an exemplary embodiment of the present invention.

In this embodiment, as illustrated in FIG. 5, a wireless communication terminal is provided, comprising: an LTE/LTE-A communication module 510, a coordination unit 520 and a coexistence communication module 530, wherein the LTE/LTE-A communication module 510 comprises a transmitting unit 511 and a receiving unit 512.

In one example, the coordination unit 520 is configured to adopt a default TDM operation mode between the LTE/LTE-A communication module 510 and the coexistence communication module 530 if the coexistence communication module 530 has been started, before the transmitting unit 511 transmits assistant information to an eNB. The default setting for example may be an unique TDM default setting commonly known by the wireless communication terminal and the eNB, such as an unique TDM default setting commonly known in the whole network (including the eNB and the terminal). The terminal of this embodiment is suitable for the scenario in FIG. 3 while omitting step S320. The coordination unit 520 performs the above operation after the source eNB transmits the notification message of the start of the coexistence communication module to the target eNB.

In this embodiment, the target eNB acquires the default TDM mode adopted by the terminal according to the notification message of the start of the coexistence communication module from the source eNB.

Embodiment 6

In this embodiment, the wireless communication terminal includes: an LTE/LTE-A communication module 510, a coordination unit 520 and a coexistence communication module 530, wherein the LTE/LTE-A communication module 510 includes a transmitting unit 511 and a receiving unit 512. The transmitting unit 511 is configured to transmit a notification message of a start of the coexistence communication module to an eNB before transmitting assistant information to the eNB. For example, the transmitting unit 511 may transmit the notification message of the start of the coexistence communication module to the eNB when the coexistence communication module is just started, or the coexistence communication module has been started and data is to be transmitted, or transmit the notification message of the start of the coexistence communication module to the eNB serving as a target eNB when it is determined that a network handover is just completed and the coexistence communication module has been started.

At that time, the coordination module 520 is configured to adopt TDM operation mode between the LTE/LTE-A communication module 510 and the coexistence communication module 530 before the transmitting unit 511 transmits the assistant information to the eNB.

Specifically, in one example, the coordination unit 520 may be configured to adopt a default TDM operation mode between the LTE/LTE-A communication module 510 and the coexistence communication module 530 before the assistant information is transmitted to the eNB. The default setting for example may include: an unique TDM default setting commonly known by the wireless communication terminal and the eNB. In that case, the notification message of the start of the coexistence communication module transmitted by the transmitting unit 511 may not carry any TDM setting information, or carry the default TDM setting information. The terminal having such configuration is suitable for the scenario as illustrated in FIG. 2.

In another example, the notification message of the start of the coexistence communication module transmitted by the transmitting unit 511 may carry the initial TDM setting information. The initial TDM setting information for example may include: an unique TDM default setting commonly known by the wireless communication terminal and the eNB, such as the unique TDM default setting commonly known in the whole network (including the eNB and the terminal); a TDM setting selected from a TDM setting list of the wireless communication terminal; a periodic measurement gap setting of the current LTE/LTE-A system; or a TDM setting newly set by the terminal according to the current system condition (e.g., network environment). In that case, the coordination unit 520 adopts the initial TDM mode selected by the terminal to coordinate the operation between the LTE/LTE-A communication module and the coexistence communication module, before the transmitting unit 511 provides the assistant information to the eNB, so as to avoid the in-device coexistence interference before the assistant information is transmitted. The terminal having such configuration is suitable for the scenario as illustrated in FIG. 2.

In another example, the receiving unit 512 of the LTE/LTE-A communication module 510 is configured to receive from an eNB a first mode setting message that carries initial TDM setting information. The TDM setting information carried in the first mode setting message for example may include: an unique TDM default setting commonly known by the wireless communication terminal and the eNB, such as the unique TDM default setting commonly known in the whole network (including the eNB and the terminal); a TDM setting selected from a TDM setting list of the eNB; a periodic measurement gap setting of the current LTE/LTE-A system; or a TDM setting set by the eNB according to the current network environment. In that case, the coordination unit 520 may adopt the initial TDM mode from the eNB to coordinate the operation between the LTE/LTE-A communication module and the coexistence communication module, before the transmitting unit 511 provides the assistant information to the eNB, so as to avoid the in-device coexistence interference before the assistant information is transmitted. The terminal having such configuration is suitable for the scenario as illustrated in FIG. 1.

Optionally, the transmitting unit 511 is further configured to transmit setting confirmation information to the eNB after the receiving unit 512 receives the first mode setting message.

In this embodiment, the transmitting unit 511 may be further configured to transmit assistant information to the eNB. The receiving unit 512 may be further configured to receive from the eNB a second mode setting message that carries second mode setting information indicating an operation mode (FDM or TDM operation mode) to be adopted between the LTE/LTE-A communication module and the coexistence communication module. The coordination module 520 is further configured to adopt the operation mode (FDM or TDM operation mode) indicated by the second mode setting information between the LTE/LTE-A communication module and the coexistence communication module, after the receiving unit 512 receives the second mode setting message.

In this embodiment, the eNB includes a receiving unit 610, a transmitting unit 630 and a determining unit 620, wherein the receiving unit 610 and the transmitting unit 630 may be provided in the transceiver of the eNB.

The receiving unit 610 of the eNB is configured to receive from a wireless communication terminal a notification message of a start of a coexistence communication module before receiving assistant information from the wireless communication terminal, wherein the notification message may carry or not carry TDM setting information. When the notification message does not carry the TDM setting information neither does it indicate the default TDM setting information (at that time, the notification message only indicates the start of the coexistence communication module), the transmitting unit 630 of the eNB transmits a first mode setting message carrying the TDM setting information to the wireless communication terminal. The TDM setting information carried in the first mode setting message for example may be an unique TDM default setting commonly known by the wireless communication terminal and the eNB, such as the unique TDM default setting commonly known in the whole network (including the eNB and the terminal), a TDM setting selected from a TDM setting list of the eNB, a periodic measurement gap setting of the current LTE/LTE-A system, or a TDM setting set by the eNB according to the current network environment. When the notification message indicates the default TDM setting information or carries the TDM setting information, the transmitting unit of the eNB may transmit a notification response message to the wireless communication terminal.

The receiving unit 610 is further configured to receive the assistant information from the terminal.

The determining unit 620 is configured to determine, after the receiving unit 610 receives the assistant information from the wireless communication terminal, an operation mode to be adopted between the LTE/LTE-A communication module and the coexistence communication module of the wireless communication terminal according to the assistant information; and the transmitting unit 630 is further configured to transmit to the wireless communication terminal a second mode setting message that carries mode setting information indicating the operation mode determined by the determining unit.

Embodiment 7

In this embodiment, a wireless communication terminal is provided, which is corresponding to the scenarios as illustrated in FIGS. 3 and 4. In this embodiment, the terminal includes an LTE/LTE-A communication module 510, a coordination unit 520 and a coexistence communication module 530, wherein the LTE/LTE-A communication module 510 includes a transmitting unit 511 and a receiving unit 512, which may be provided in the transceiver of the LTE/LTE-A communication module 510.

In this embodiment, the receiving unit 512 receives from the target eNB the first mode setting message that carries the TDM setting information, before the transmitting unit 511 transmits the assistant information to the target eNB.

The coordination unit 520 is configured to adopt the TDM operation mode between the LTE/LTE-A communication module and the coexistence communication module, before the assistant information is transmitted to the target eNB.

Optionally, the transmitting unit 511 is further configured to transmit a setting confirmation message to the target eNB, after the receiving unit 511 receives the first mode setting message from the target eNB.

In addition, the transmitting unit 511 is further configured to transmit the assistant information to the target eNB.

In that case, the receiving unit 512 is further configured to receive from the target eNB a second mode setting message that carries second mode setting information (e.g., FDM setting information or TDM setting information) indicating an operation mode to be adopted between the LTE/LTE-A communication module and the coexistence communication module; and the coordination module 520 is further configured to adopt the operation mode indicated by the second mode setting information between the LTE/LTE-A communication module 510 and the coexistence communication module 530, after the receiving unit 512 receives the second mode setting message.

In this embodiment, the target eNB includes a receiving unit 610, a transmitting unit 630 and a determining unit 620, wherein the receiving unit 610 and the transmitting unit 630 may be provided in the transceiver of the target eNB.

The receiving unit 610 of the target eNB is configured to receive a notification message of a start of a coexistence communication module from a source eNB before receiving assistant information from a wireless communication terminal, wherein the notification message of the start of a coexistence communication module may carry or not carry initial TDM setting information. When the notification message does not carry the TDM setting information neither does it indicate the default TDM setting information, the transmitting unit 630 of the eNB may transmit a first mode setting message carrying the TDM setting information to the wireless communication terminal. The TDM setting information carried in the first mode setting message for example may be an unique TDM default setting commonly known by the wireless communication terminal and the eNB, such as the unique TDM default setting commonly known in the whole network (including the eNB and the terminal); a TDM setting selected from a TDM setting list of the target eNB; a periodic measurement gap setting of the current LTE/LTE-A system; or a TDM setting set by the target eNB according to the current network environment. When the notification message from the source eNB carries the initial TDM setting information, the transmitting unit of the target eNB also transmits the first mode setting message carrying the TDM setting information to the wireless communication terminal, wherein the initial TDM setting carried in the first mode setting message may be the initial TDM setting in the notification message of the start of the coexistence communication module from the source eNB. If the target eNB determines that the TDM setting from the source eNB is not suitable for the target eNB, the target eNB may also reselect or reset appropriate TDM setting information according to the system condition, and provides it to the terminal.

The receiving unit 610 is further configured to receive the assistant information from the terminal.

The determining unit 620 is configured to determine, after the receiving unit 610 receives assistant information from the wireless communication terminal, an operation mode to be adopted between the LTE/LTE-A communication module and the coexistence communication module of the wireless communication terminal according to the assistant information; and the transmitting unit 630 is further configured to transmit to the wireless communication terminal a second mode setting message that carries mode setting information indicating the operation mode determined by the determining unit.

It shall be appreciated that each of the above parts may be implemented by hardware, software, firmware, or combinations thereof. In addition, the above parts may be combined into a larger part or divided into a plurality of smaller parts.

The above devices and methods of the present invention may be implemented by hardware, or a combination of hardware and software. The present invention further relates to a computer readable program which when being executed by a logic part, enables the logic part to implement the aforementioned device or constituent parts, or enables the logic part to implement the aforementioned methods or steps. The present invention further relates to a storage medium for storing the above program, such as hard disc, magnetic disc, optical disc, DVD, flash memory, etc.

Although the specific features of the present invention are described with respect to one or more exemplary embodiments, these features can be combined with one or more other features in other embodiments upon demand and in consideration of benefiting any given or specific application.

Finally to be noted, the terms "comprise", "include" or any other variant intend to cover nonexclusive inclusions, so that a process, a method, an article or a device comprising a series of elements includes not only those elements, but also other elements not explicitly listed, or inherent elements of the process, the method, the article or the device.

Although the embodiments of the present invention are detailedly described with reference to the drawings, it shall be appreciated that the above embodiments are just used to explain the present invention rather than making limitations thereto. A person skilled in the art can make various modifications and changes to those embodiments without deviating from the substance and the scope of the present invention. Therefore, the scope of the present invention is only defined by the accompanied claims and their equivalents.

The invention claimed is:

1. A method for avoiding in-device coexistence interference in a wireless communication terminal having communication module and coexistence communication module, the method comprising:

transmitting a notification message of a start of the coexistence communication module to an eNodeB (eNB);

adopting, by the wireless communication terminal, a Time Division Multiplexing (TDM) operation mode between the communication module and the coexistence communication module, before transmitting assistant information to the eNB;

transmitting the assistant information to the eNB;

receiving from the eNB a second mode setting message that carries second mode setting information indicating an operation mode to be adopted between the communication module and the coexistence communication module; and adopting, by the wireless communication terminal, the operation mode indicated by the second mode setting information between the communication module and the coexistence communication module after receiving the second mode setting message.

2. The method according to claim 1, wherein:
the adopting further comprising, by the wireless communication terminal, a default TDM operation mode between the communication module and the coexistence communication module, before transmitting the assistant information to the eNB.

3. The method according to claim 1, wherein:
the notification message carries TDM setting information for the TDM operation mode.

4. The method according to claim 3, wherein:
the TDM setting information comprising: a unique TDM default setting commonly known by the wireless communication terminal and the eNB, a TDM setting selected from a TDM setting list in the wireless communication terminal, a periodic measurement gap setting of the communication system used by the communication module, or a TDM setting set by the wireless communication terminal according to the current network environment.

5. The method according to claim 1, the method further comprising:
receiving from the eNB a first mode setting message that carries TDM setting information for the TDM operation mode.

6. The method according to claim 5, wherein:
the TDM setting information comprising: a unique TDM default setting commonly known by the wireless communication terminal and the eNB, a TDM setting selected from a TDM setting list in the eNB, a periodic measurement gap setting of the Communication system used by the communication module, or a TDM setting set by the eNB according to the current network environment.

7. The method according to claim 1, wherein in the transmitting, the wireless communication terminal transmits the notification message to the eNB when it is determined that the coexistence communication module is just started, or the wireless communication terminal transmits the notification message to the eNB when it is determined that the coexistence communication module has been started and there is data to be transmitted by the coexistence communication module, or the wireless communication terminal transmits the notification message to the eNB serving as a target eNB when it is determined that a network handover is just completed and the coexistence communication module has been started.

8. The method according to claim 1, wherein:
the assistant information comprises Frequency Division Multiplexing (FDM) based assistant information and/or TDM based assistant information; and
the operation mode indicated by the second mode setting information comprises an FDM operation mode or a TDM operation mode.

9. The method according to claim 1, wherein:
the communication module performing communication using Long Term Evolution/enhanced Long Term Evolution (LTE/LTE-A) system.

10. A non-transitory computer readable program, wherein when being executed in a wireless communication apparatus, the program enables the wireless communication apparatus to execute the method for avoiding in-device coexistence interference in the wireless communication terminal according to claim 1.

11. A non-transitory storage medium that stores a computer readable program, wherein the computer readable program enables the wireless communication apparatus to execute the method for avoiding in-device coexistence interference in the wireless communication terminal according to claim 1.

12. A method for avoiding in-device coexistence interference in a wireless communication terminal having communication module and coexistence communication module, the method comprising:
receiving from a target eNodeB (eNB) a first mode setting message that carries TDM setting information for a TDM operation mode after a source eNB for network handover transmits to the target eNB a notification message of a start of the coexistence communication module;
adopting, by the wireless communication terminal, the TDM operation mode between the communication module and coexistence communication module before transmitting assistant information to the target eNB;
transmitting the assistant information to the target eNB;
receiving from the target eNB a second mode setting message that carries second mode setting information indicating an operation mode to be adopted between the communication module and the coexistence communication module; and
adopting, by the wireless communication terminal, the operation mode indicated by the second mode setting information between the communication module and the coexistence communication module after receiving the second mode setting message.

13. The method according to claim 12, wherein:
the TDM setting information carried by the first mode setting message comprises: a unique TDM default setting commonly known by the wireless communication terminal and the target eNB, a TDM setting selected from a TDM setting list in the target eNB, a periodic measurement gap setting of the Communication system used by the communication module, or a TDM setting set by the target eNB according to the current network environment.

14. The method according to claim 12, wherein:
the notification message carries the TDM operation mode setting information that comprises a unique TDM default setting commonly known by the wireless communication terminal, the source eNB and the target eNB, a TDM setting selected from a TDM setting list in the source eNB, a periodic measurement gap setting of the current Communication system used by the communication module, or a TDM setting set by the source eNB according to the current network environment.

15. The method according to claim 12, wherein:
the assistant information comprises FDM based assistant information and/or TDM based assistant information;
the operation mode indicated by the second mode setting information comprises an FDM operation mode or a TDM operation mode.

16. The method according to claim 12, wherein:
the communication module performing communication using Long Term Evolution/enhanced Long Term Evolution (LTE/LTE-A) system.

17. A non-transitory computer readable program, wherein when being executed in a wireless communication apparatus, the program enables the wireless communication apparatus to execute the method for avoiding in-device coexistence interference in the wireless communication terminal according to claim 12.

18. A non-transitory storage medium that stores a computer readable program, wherein the computer readable program enables the wireless communication apparatus to execute the method for avoiding in-device coexistence interference in the wireless communication terminal according to claim 12.

19. A method for avoiding in-device coexistence interference in a wireless communication terminal having communication module and coexistence communication module, the method comprising:

in case during a network handover, a source eNodeB (eNB) of the wireless communication terminal transmits to a target eNB a notification message of a start of the coexistence communication module, adopting, by the wireless communication terminal, a default TDM operation mode between the communication module and the coexistence communication module before transmitting assistant information to the target eNB;

transmitting the assistant information to the target eNB;

receiving from the target eNB a second mode setting message that carries second mode setting information indicating an operation mode to be adopted between the communication module and the coexistence communication module; and adopting, by the wireless communication terminal, the operation mode indicated by the second mode setting information between the communication module and the coexistence communication module after receiving the second mode setting message.

20. The method according to claim 19, wherein:
the communication module performing communication using Long Term Evolution/enhanced Long Term Evolution (LTE/LTE-A) system.

21. A non-transitory computer readable program, wherein when being executed in a wireless communication apparatus, the program enables the wireless communication apparatus to execute the method for avoiding in-device coexistence interference in the wireless communication terminal according to claim 19.

22. A non-transitory storage medium that stores a computer readable program, wherein the computer readable program enables the wireless communication apparatus to execute the method for avoiding in-device coexistence interference in the wireless communication terminal according to claim 19.

23. A method for avoiding in-device coexistence interference in a wireless communication terminal having communication module and coexistence communication module, the method comprising:

receiving from the wireless communication terminal a notification message of a start of the coexistence communication module before receiving assistant information from the wireless communication terminal, wherein the notification message indicates first information that the coexistence communication module has been started, or second information that the coexistence communication module has been started and the wireless communication terminal adopts a default TDM operation mode or a TDM operation mode set by itself between the communication module and the coexistence communication module;

transmitting a first mode setting message that carries TDM setting information to the wireless communication terminal, when the notification message indicates the first information;

receiving assistant information from the wireless communication terminal;

determining an operation mode to be adopted between the communication module and the coexistence communication module according to the assistant information received; and transmitting to the wireless communication terminal a second mode setting message that carries second mode setting information indicating the determined operation mode.

24. The method according to claim 23, wherein:
the TDM setting information comprising: an unique TDM default setting commonly known by the wireless communication terminal and an eNB, a TDM setting selected from a TDM setting list in the eNB, a periodic measurement gap setting of the current Communication system used by the communication module, or a TDM setting set by the eNB according to the current network environment.

25. The method according to claim 23, wherein:
when the second information is that the coexistence communication module has been started and the wireless communication terminal adopts the TDM operation mode set by itself between the communication module and the coexistence communication module, the notification message carries TDM setting information that comprises an unique TDM default setting commonly known by the wireless communication terminal and an eNB, a TDM setting selected from a TDM setting list in the wireless communication terminal, a periodic measurement gap setting of the current Communication system used by the communication module, or a TDM setting set by the terminal according to the current network environment.

26. The method according to claim 25, wherein:
the communication module performing communication using Long Term Evolution/enhanced Long Term Evolution (LTE/LTE-A) system.

27. The method according to claim 23, wherein:
the assistant information comprises FDM based assistant information and/or TDM based assistant information;
the determined operation mode comprises an FDM operation mode or a TDM operation mode.

28. The method according to claim 23, wherein:
the communication module performing communication using Long Term Evolution/enhanced Long Term Evolution (LTE/LTE-A) system.

29. A non-transitory computer readable program, wherein when being executed in a wireless communication apparatus, the program enables the wireless communication apparatus to execute the method for avoiding in-device coexistence interference in the wireless communication terminal according to claim 23.

30. A non-transitory storage medium that stores a computer readable program, wherein the computer readable program enables the wireless communication apparatus to execute the method for avoiding in-device coexistence interference in the wireless communication terminal according to claim 23.

31. A method for avoiding in-device coexistence interference in a wireless communication terminal having communication module and coexistence communication module, the method comprising:

receiving, by a target eNodeB (eNB), from a source eNB a notification message of a start of the coexistence communication module before receiving assistant information from the wireless communication terminal;

transmitting a first mode setting message that carries TDM setting information to the wireless communication terminal;
receiving assistant information from the wireless communication terminal;
determining an operation mode to be adopted between the communication module and the coexistence communication module of the wireless communication terminal according to the assistant information received; and
transmitting to the wireless communication terminal a second mode setting message that carries second mode setting information indicating the determined operation mode.

32. The method according to claim 31, wherein:
the TDM setting information comprising: an unique TDM default setting commonly known by the wireless communication terminal and the target eNodeB (eNB), a TDM setting selected from a TDM setting list in the target eNB, a periodic measurement gap setting of the current Communication system used by the communication module, or a TDM setting set by the target eNB according to the current network environment.

33. The method according to claim 32, wherein:
the notification message carries the TDM setting information comprising: an unique TDM default setting commonly known by the wireless communication terminal, the source eNB and the target eNB, a TDM setting selected from a TDM setting list in the source eNB, a periodic measurement gap setting of the current Communication system used by the communication module, or a TDM setting set by the source eNB according to the current network environment.

34. The method according to claim 31, wherein:
the assistant information comprises FDM based assistant information and/or TDM based assistant information;
the determined operation mode comprises an FDM operation mode or a TDM operation mode.

35. The method according to claim 31, further comprising:
in case the wireless communication terminal undergoes a network handover again, transmitting to a target eNB of this handover a notification message of the start of the coexistence communication module, when the coexistence communication module of the wireless communication terminal has been started.

36. A non-transitory computer readable program, wherein when being executed in a wireless communication apparatus, the program enables the wireless communication apparatus to execute the method for avoiding in-device coexistence interference in the wireless communication terminal according to claim 31.

37. A non-transitory storage medium that stores a computer readable program, wherein the computer readable program enables the wireless communication apparatus to execute the method for avoiding in-device coexistence interference in the wireless communication terminal according to claim 31.

38. A wireless communication terminal having communication module and coexistence communication module, the communication module comprising a transmitting unit and a receiving unit, wherein,
the transmitting unit is configured to transmit a notification message of a start of the coexistence communication module to an eNodeB (eNB) before transmitting assistant information to the eNB, and configured to transmit the assistant information to the eNB;
the receiving unit configured to receive from the eNB a second mode setting message that carries second mode setting information indicating an operation mode to be adopted between the communication module and the coexistence communication module; and
the wireless communication terminal further comprising:
a coordination module configured to adopt a Time Division Multiplexing (TDM) operation mode between the communication module and the coexistence communication module before the transmitting unit transmits the assistant information to the eNB, wherein,
the wireless communication terminal adapts the operation mode indicated by the second mode setting information between the communication module and the coexistence communication module after receiving the second mode setting message.

39. A wireless communication terminal having communication module and coexistence communication module, the communication module comprising a transmitting unit and a receiving unit, wherein,
the receiving unit is configured to receive from a target eNodeB (eNB) a first mode setting message that carries TDM setting information for a TDM operation mode, after the wireless communication terminal completes a network handover and before the transmitting unit transmits assistant information to the target eNB;
the transmitting unit configured to transmit the assistant information to the eNB; and
the receiving unit further configured to receive from the eNB a second mode setting message that carries second mode setting information indicating an operation mode to be adopted between the communication module and the coexistence communication module;
the wireless communication terminal further comprising:
a coordination unit configured to adopt the TDM operation mode between the communication module and coexistence communication module before the assistant information is transmitted to the target eNB, wherein
the wireless communication terminal adapts the operation mode indicated by the second mode setting information between the communication module and the coexistence communication module after receiving the second mode setting message.

40. A wireless communication terminal having communication module and coexistence communication module, the communication module comprising a transmitting unit and a receiving unit, wherein the wireless communication terminal further comprising:
a coordination unit configured to adopt a default TDM operation mode between the communication module and coexistence communication module after a network handover of the wireless communication terminal is completed and before the transmitting unit transmits assistant information to an eNB; and
the transmitting unit configured to transmit the assistant information to the eNB;
the receiving unit configured to receive from the eNB a second mode setting message that carries second mode setting information indicating an operation mode to be adopted between the communication module and the coexistence communication module, wherein
the wireless communication terminal adapts the operation mode indicated by the second mode setting information between the communication module and the coexistence communication module after receiving the second mode setting message.

41. An eNodeB (eNB), comprising:
a receiving unit configured to receive from a wireless communication terminal a notification message of a start of a coexistence communication module before receiving assistant information from the wireless communication terminal, wherein the notification message indicates first information that the coexistence communication module has been started, or second information that the coexistence communication module has been started and the wireless communication terminal adopts a default TDM operation mode or a TDM operation mode set by itself between the communication module and the coexistence communication module; and a transmitting unit configured to transmit a first mode setting message that carries TDM setting information to the wireless communication terminal, when the notification message indicates the first information;

the receiving unit further configured to receive the assistant information from the wireless communication terminal; and the transmitting unit further configured to transmit a second mode setting message that carries second mode setting information indicating an operation mode to be adopted by the wireless communication terminal between a communication module and a coexistence communication module of the wireless communication terminal.

42. An eNodeB (eNB), comprising:

a receiving unit configured to receive from a source eNB of a wireless communication terminal a notification message of a start of a coexistence communication module, before receiving assistant information from the wireless communication terminal; and a transmitting unit configured to transmit a first mode setting message that carries TDM setting information to the wireless communication terminal;

the receiving unit further configured to receive the assistant information from the eNB;

the transmitting unit further configured to transmit a second mode setting message that carries second mode setting information indicating an operation mode to be adopted by the wireless communication terminal between a communication module and a coexistence communication module of the wireless communication terminal.

\* \* \* \* \*